United States Patent

[11] 3,573,742

[72] Inventor George Riddell
Lincroft, N.J.
[21] Appl. No. 750,562
[22] Filed Aug. 6, 1968
[45] Patented Apr. 6, 1971
[73] Assignee Bell Telephone Laboratories, Inc.
Murray Hill, Berkeley Heights, N.J.

[54] DATA REGISTRATION SYSTEM
16 Claims, 10 Drawing Figs.

[52] U.S. Cl. .......... 340/172.5, 340/146.2
[51] Int. Cl. .......... G06f 3/04
[50] Field of Search .......... 340/146.1, 146.2; 235/177; 325/41; 340/172.5; 235/157

[56] References Cited

UNITED STATES PATENTS

| | | | |
|---|---|---|---|
| 2,997,540 | 8/1961 | Ertman et al. | 340/146.1X |
| 3,289,160 | 11/1966 | Carter et al. | 340/146.2 |
| 3,417,377 | 12/1968 | Vietor et al. | 340/172.5 |
| 3,426,323 | 2/1969 | Shimabukuro | 340/146.1 |
| 3,434,109 | 3/1969 | Coote | 235/177X |

*Primary Examiner*—Paul J. Henon
*Assistant Examiner*—Sydney Chirlin
*Attorneys*—R. J. Guenther and James Warren Falk

ABSTRACT: A register translator circuit is disclosed which receives plural order binary data from a time division pulse code modulation system and in response thereto, (1) registers the data in storage flip-flops, (2) checks the data for parity, (3) compares the registered data with that subsequently received on a retransmission of the same information, and (4) if the comparison test passes, translates the registered information into a plurality of 1-out-of-N bits. If either the parity or comparison test fails, the input flip-flops are reset and the above operations are repeated until identical data with good parity is received on two successive transmissions.

Each data word is represented by a timewise staggered sequence of signals not all of which are overlapping. Because all signals representing a word do not overlap, a comparison circuit is provided which is divided into a first and a second half each of which is individual to a corresponding portion of the data word received on successive transmissions.

INVENTOR
G. RIDDELL
BY Donald M Duft
ATTORNEY

PATENTED APR 6 1971 3,573,742

SHEET 2 OF 5

DATA REGISTRATION SYSTEM

BACKGROUND OF THE INVENTION

This invention relates to a data registration system and, in particular, to a system in which signals representing a data word to be registered are received in parallel form but in a timewise staggered sequence in which there is an overlap between some, but not all, signals of the sequence. The invention further relates to a data registration system in which a comparison circuit is provided for comparing a data word stored in an input register with the timewise staggered sequence of signals received during a retransmission of the same word.

It is common practice in data transmission and registration systems to transmit each word a plurality of times so that the receiving equipment may compare the successive transmissions. If the comparison circuit in the data receiver indicates an identity between two successive transmissions, the information registered on a first transmission is assumed to be good. If an identity between the two transmissions is not detected, the input register is reset and the above procedure is repeated until a good comparison between two successive transmissions is obtained.

The above expedient is reasonably satisfactory in systems in which plural order data is received in parallel form and is simultaneously applied to all inputs of the comparison circuit. The comparison circuit in this case need not contain any storage facilities or memory elements, i.e., flip-flops, and instead, may utilize relatively inexpensive AND gates to perform an instantaneous comparison of the currently received information with that stored in an input register on a preceding transmission. The comparison circuit performs this operation on an instantaneous basis by ANDING the contents of the register with the newly received input signals. The ANDING operation obviously must occur during the brief period of time that the signals for the repeated transmission of the word are being received. At the end of this period of time, or prior thereto, logic circuitry associated with the AND gates must generate an output signal indicating whether or not a good comparison is detected.

The above comparison technique is not possible in systems in which signals representing plural order data are received in a staggered timewise sequence so that an overlapping occurs between some, but not all, signals of a word. Since there is no single instant of time in which all of the signals of a word are concurrent, the comparison circuit cannot merely use AND gates to perform a comparison operation on an instantaneous basis. Instead, it must use storage facilities, such as a second register, so that signals representing the two successive transmissions of the same word may be simultaneously available for a period of time sufficient for the comparison operation to be effected. The provision of a register or other similar storage facilities in the comparison circuit greatly increases the cost and complexity of the receiving equipment of which the comparison circuit is a part.

BRIEF SUMMARY OF THE INVENTION

It is, therefore, an object of the invention to provide an improved data registration system in which the signals representing data words to be registered are received on a parallel basis, but in a staggered sequence with respect to time.

It is a further object to provide improved equipment for comparing successive transmissions of the same word in systems in which the signals to be registered are received in a staggered sequence.

In accordance with my invention, I provide a data registration system having a comparison circuit that is divided into a first and a second half each of which is individual to the corresponding portion of a received data word represented by a timewise staggered sequence of signals. Each half of the comparison circuit is independently effective during a data-receiving operation to perform a comparison operation on the signals representing the portion of the word to which it is individual. The comparison circuit is divided in such a manner that all of the staggered input signals received by each half overlap in part with each other but not with all signals of the other half. The partial timewise overlap between all the signals received by each half defines a brief period of time during which data signals are simultaneously applied to all inputs of each separate half of the comparison circuit. This permits my comparison circuit to eliminate the storage flip-flops that would otherwise be required and instead, to utilize inexpensive AND gate logic circuitry to compare on an instantaneous basis the word signals currently received by each half with the contents of the corresponding orders of the register as received on a prior transmission of the same word.

Further in accordance with my invention, an indication as to whether or not a good comparison exists in each half is independently generated by each portion of the comparison circuit under control of specially transmitted binary bits of which one bit is transmitted immediately prior to the beginning of a data word, one bit is transmitted in the middle of a data word, and a further bit is transmitted upon the conclusion of a data word. These three specially transmitted bits are included in the aforementioned staggered sequence of signals received by the register. The first specially transmitted bit comprises a data present signal; the second bit comprises a midword signal; and the last bit comprises a second data present signal. The signals representing the binary bits of a word that is to be registered are positioned in the staggered sequence intermediate the first data present signal and the midword signal, as well as between the midword signal and the second data present signal. The degree of overlap of the input signals comprising the sequence is such that the first data present signal and the midword signal, together with all the data signal therebetween overlap in part. In other words, the leading edge of the midword signal occurs in time before the trailing edge of the first data present signal. Similarly, the midword signal and the second data present signal, together with all of the data signals therebetween are also concurrent in part.

The first data present signal and the midword signal are applied to a first AND gate which, during the overlap of the two signals, generates a gating pulse for the first half of the comparison circuit. This overlap of the first data present signal and the midword signal defines the time during which all data signals for the first half are concurrent. In other words, during this time, all signals for the first half of the data word currently being received are simultaneously applied to the first half of the comparison circuit. Also applied to the first half of the comparison circuit at this time are the contents of the corresponding portion of the data word currently in the register by virtue of a previous transmission. Thus, at this time, the first half of the comparison circuit has all the information it requires to compare one-half of the data word as received on two successive transmissions. The output pulse of the first AND gate is applied to the first half of the comparison circuit to cause it to generate an output signal indicating whether or not a good comparison is detected between the two transmissions.

In a similar manner, the midword signal and the second data present signal are applied as inputs to a second AND gate which, during the overlap of the two signals, generates gating pulse for the second half of the comparison circuit. This overlap of these two signals defines the time during which all data signals for the second half of a received word are concurrent with each other as well as with the midword and the second data present signal. Thus, during this overlap, the data signals for the second half of a received word are simultaneously applied to the second half of the comparison circuit. The contents of the corresponding orders of the data word stored in the register are also applied to the comparison circuit at this time. Thus, the second half of the comparison circuit now has all the information it requires to perform an instantaneous comparison on the second half of the word as received on two successive transmissions. At this time, an output pulse is generated by the second AND gate and is applied to the second half of the comparison circuit to cause it to generate an output signal indicating whether or not a good comparison is detected between the information received on the two transmissions.

Prior to the comparison operation, the information entered into the register on a first transmission is checked for parity and a signal indicative of good or bad parity is applied to the comparison circuit. A comparison operation is not performed on the next transmission unless a signal indicating good parity is received. If bad parity is detected on the first transmission, the input register is immediately reset and the word received on the next transmission is entered into the register. The above sequence of operations are then repeated until a word is registered with parity and a signal to this effect is applied to the comparison circuit.

Further in accordance with my invention, a comparison operation is performed on the second half of a newly received word only in the event that good comparison is detected for the first half of the word. This feature eliminates the possibility of a comparison operation being performed on the second half of the word after it has already been determined that bad comparison exists for the first half. In accordance with this feature, the output signal of the first half of the comparison circuit provides an indication as to whether or not a comparison operation should be performed by the second half. If good comparison is detected on the first half, a signal to this effect is transmitted to the second half which, in turn, performs its required comparison operation in the manner already indicated. However, if a bad comparison is detected on the first half, a comparison operation is not performed by the second half, and instead, the output signal from the first half is used to reset the input registers so that the priorly described operations may again be repeated until a good comparison is obtained, including good parity for the first half of the word.

In the event that good comparison is obtained on the first half of the word, but bad comparison is detected on the second half, the register is immediately reset and the foregoing operations are repeated until good comparison is obtained over both halves of a word on two successive transmissions. Finally, when good comparison is detected, the output signal indicating good parity from the second half is utilized as a control signal to transfer the information currently stored in the register to a data utilization circuit. In the disclosed exemplary embodiment of my invention, the data word that is transferred out of the register at this time is applied to a plurality of translators which translate the word into a plurality of 1-out-of-*N* type information bits which, in turn, are applied to the data utilization circuit.

The foregoing described comparison arrangement is advantageous since it permits a comparison operation to be performed economically in systems in which all of the input signals representing a data word are not concurrent with each other. By dividing the comparison operation into a plurality of segments, in accordance with the degree of overlap of the received input signals, inexpensive AND gate logic circuitry may be used to perform a comparison operation on an instantaneous basis by independently comparing the segmented portions of a word as received on successive transmissions. This segmented comparison operation minimizes the expense of the comparison operation by eliminating the need for the storage facilities that would be required in the comparison circuit in accordance with conventional type techniques in which the entirety of each word is compared.

A feature of my invention is the provision of a comparison circuit that is subdivided into a plurality of parts for comparing successive transmissions of a data word represented by a staggered sequence of signals all of which are not overlapping.

A further feature is the provision of a comparison circuit which functionally divides received signals into groups and which performs an independent comparison operation on each group of signals.

A further feature is the provision of equipment responsive to the independent comparison operations for generating a signal indicating whether the entirety of a newly received word is identical to the word received on a prior transmissions.

A further feature is the provision of a circuit for generating separate gating pulses in response to the overlap of the signals applied to each half of the comparison circuit and for utilizing each gating pulse to initiate the comparison operation on its half of a newly received word.

A further feature is the provision of circuitry responsive to an indication that the first half of a newly received word does not correspond to a priorly received word for inhibiting a comparison operation on the second half of the newly received word.

A further feature is the provision of equipment for inhibiting the generation of a signal indicating an identity between a newly received and a priorly received word whenever an identity is not detected by either half of the comparison circuit.

A further feature is the provision of a control circuit for resetting an input register if an identity is not found between both halves of a currently received and priorly recieved word.

A further feature of the invention is the provision of equipment responsive to the resetting of the register for entering the signals received on the next transmission into the register.

A further feature is the provision of a circuit for checking the registered information for parity and for inhibiting a comparison operation if a word to be compared is not registered in good parity.

A further feature is the provision of a register for receiving data words represented by a timewise staggered sequence of signals, inhibit gates connected to the input conductor for each order of the register, and a control circuit for unlocking the inhibit gates so that the register can respond to input signals only when the first signal of a newly received sequence is not concurrent with the last signal of a preceding sequence.

DESCRIPTION OF THE DRAWING

These and other objects and features of the invention will become more apparent upon a reading of the following detailed description of one specific embodiment of the invention taken in conjunction with the drawing in which.

DETAILED DESCRIPTION

LOGIC GATES—FIGS. 3A, 3B, 3C, 4A, and 4B

Figure 3A:
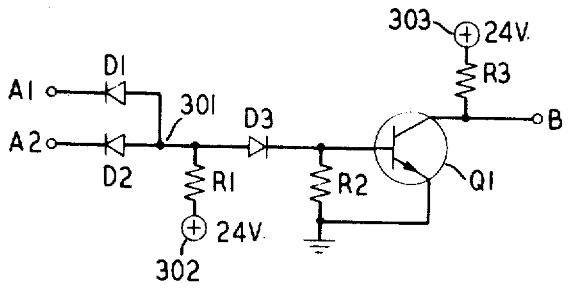
FIG. 3A discloses the details of a basic transistor logic circuit.

The presently disclosed embodiment of my invention makes extensive use of transistor resistor logic circuits in which a single transistor may be alternatively operated as an inverting AND gate or as an inverting OR gate, depending upon the nature of the input signals applied thereto and the logic function to be performed. A circuit of this type is illustrated by FIG. 3A and is shown to comprise a transistor Q1 having a collector resistor R3, a resistor R2 that is connected between the transistor base and ground, and a series circuit comprising resistor R1 and diode D3 for applying a drive current to the base of the transistor. Diodes D1 and D2 are connected to the terminal 301 and provide a means for grounding the junction of resistor R1 and diode D3.

When terminal 301 is ungrounded, the 24 volt potential on terminal 302 is applied via resistor R1 and diode D3 to the base of the transistor to maintain in an ON state in which the transistor conducts to saturation so that the collector potential on terminal B approaches that of ground.

The grounding of one or more of terminals A1 or A2 effectively grounds terminal 301 and prevents the potential on terminal 302 from providing a base drive for the transistor. Under this condition, the transistor turns OFF and the potential of its collector at terminal B is raised to 24 volts.

The circuit of FIG. 3A may be operated as an inverting OR gate by maintaining both of the input terminals A1 and A2 ungrounded so that the transistor may be driven to saturation by the potential on terminal 302. The OR condition of the circuit occurs when one or more of the terminals A1 or A2 is grounded so that the transistor turns OFF and its output on terminal B goes high.

The circuit of FIG. 3A may also be operated as an inverting AND gate. The normal or OFF condition of the gate occurs when one or more of its input terminals is grounded to hold the transistor in a nonconductive state. The AND condition of the circuit occurs when all of its input terminals are ungrounded so that the transistor may conduct to the point of saturation and apply a low or ground potential to its output terminal B.

Figure 3B:
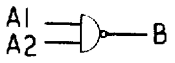
FIGS. 3B and 3C illustrate the symbol used when the circuit of FIG. 3A is operated as an inverting AND gate and as an inverter, respectively.
Figure 3C:
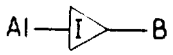

FIG. 3B illustrates the symbol used when the transistor circuit of FIG. 3A is used as an inverting AND gate. The input terminals A1 and A2 and the output terminal B correspond to the similarly designated terminals on FIG. 3A. FIG. 3C illustrates the symbol used when the basic transistor circuit of FIG. 3A is operated as an inverter (a single input inverting OR gate). The circuit has only a single input terminal A1 and its sole function is to provide an output potential that is the inverse of the potential applied to its input. In other words, a ground applied to terminal A1 turns the transistor OFF and causes a positive 24 volt potential to appear at output terminal B. Conversely, a positive potential on terminal A1, or the ungrounding of the terminal, turns the transistor ON and drives its output terminal B to a low or ground potential.

The gate of FIGS. 3B is shown as having only two input terminals A1 and A2. It is to be understood, however, that gates of this type may have as many input terminals as may reasonably be desired. Additional input terminals are provided by adding further input diodes to the basic circuit of FIG. 3A with each diode having its anode connected to terminal 301 and its cathode connected to an individual one of the additionally provided input terminals.

Figure 4A:
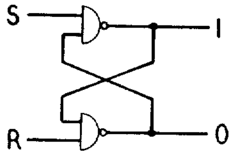
FIG. 4A illustrates how gates of the type shown in FIG. 3B may be interconnected to form a flip-flop circuit.
Figure 4B:
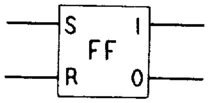
FIG. 4B illustrates the symbol used to represent a flip-flop circuit.

FIG. 4A illustrates the manner in which the AND gates of FIG. 3B may be interconnected to form a flip-flop. FIG. 4B illustrates the symbol used to represent such flip-flops. The operation of the circuit may be explained by assuming that the flip-flop is normally in a reset state in which its lower AND gate is OFF and its upper AND gate is ON. At this time, the 0 output is a ±24 volts and the 1 output is at a ground potential because of the nonconductive and conductive states of the lower and upper AND gates, respectively.

The flip-flop may be switched to its SET state by the application of a ground potential to the S input conductor. This potential turns the upper AND gate OFF and drives its output high. The high on its output is also connected to the upper input of the lower AND gate to turn it ON and drive its output low. The circuit is switched back to the reset condition of the flip-flop in a similar manner by the application of a ground to the reset R potential.

DESCRIPTION OF FIGS. 1A, 1B, AND 1C

Figure 1A:
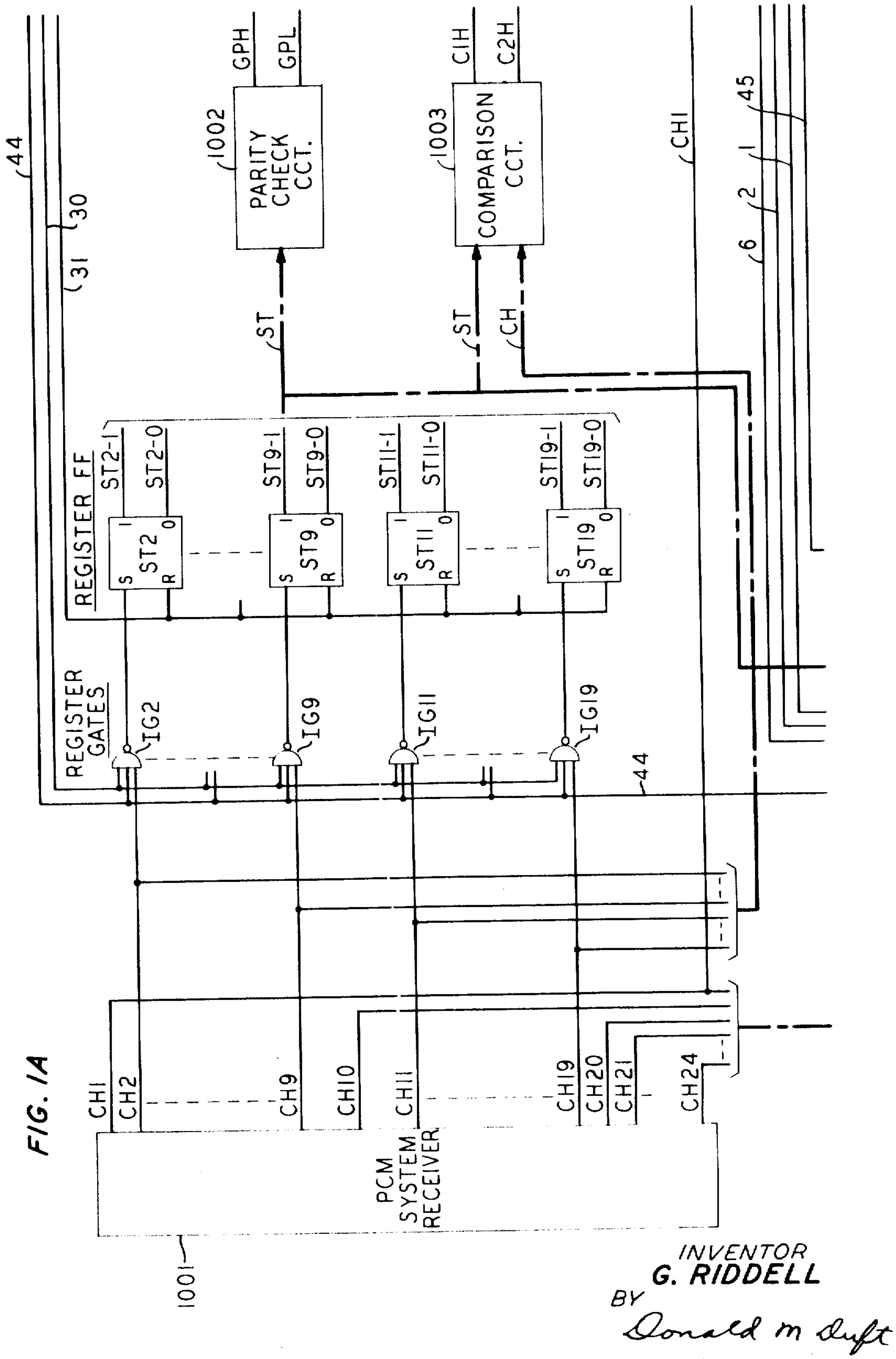
FIGS. 1A, 1B, and 1C, when arranged as shown in FIG. 1D, disclose a circuit detail of a preferred embodiment of the invention.
Figure 1B:
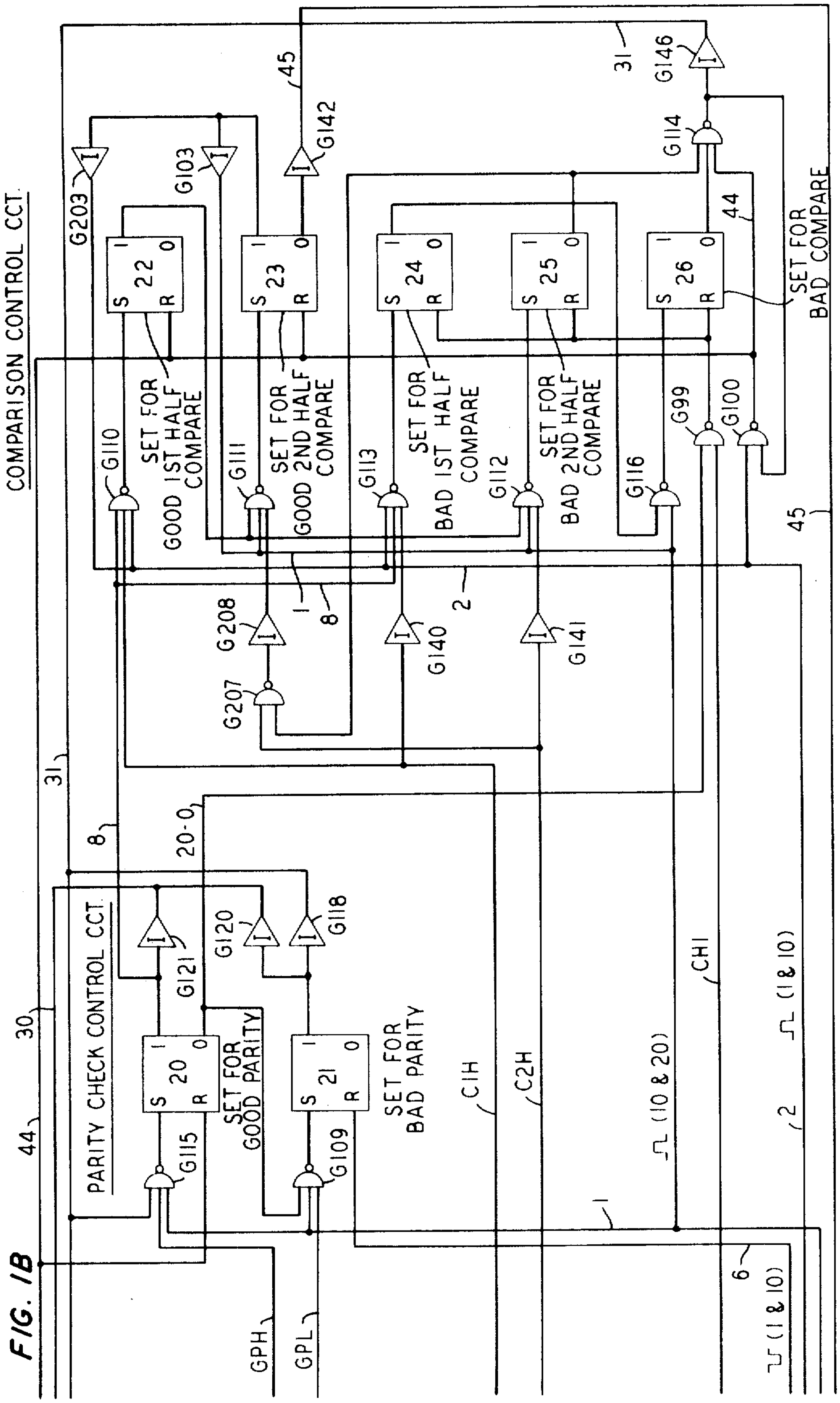
Figures 1C, 1D:
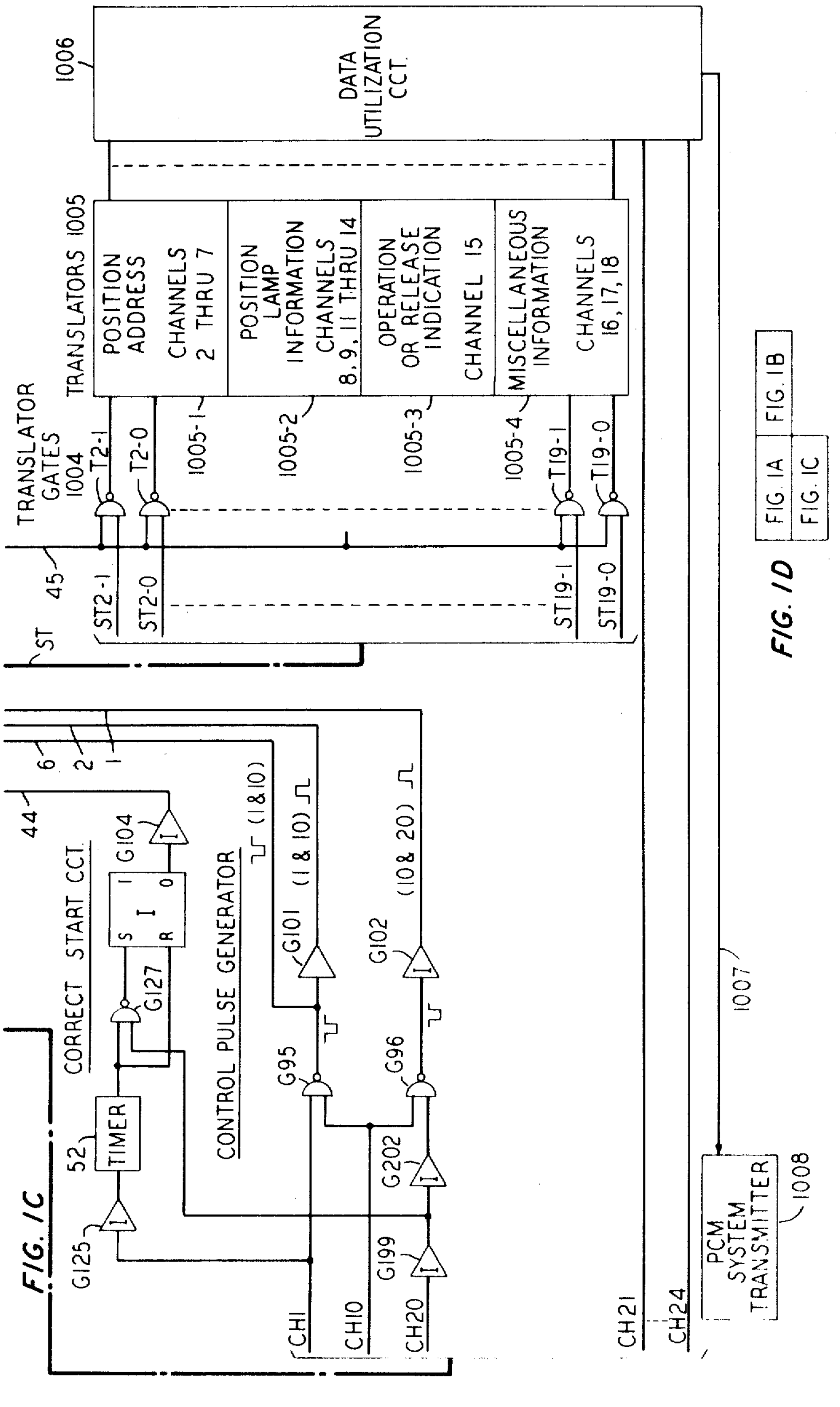
Figure 2:
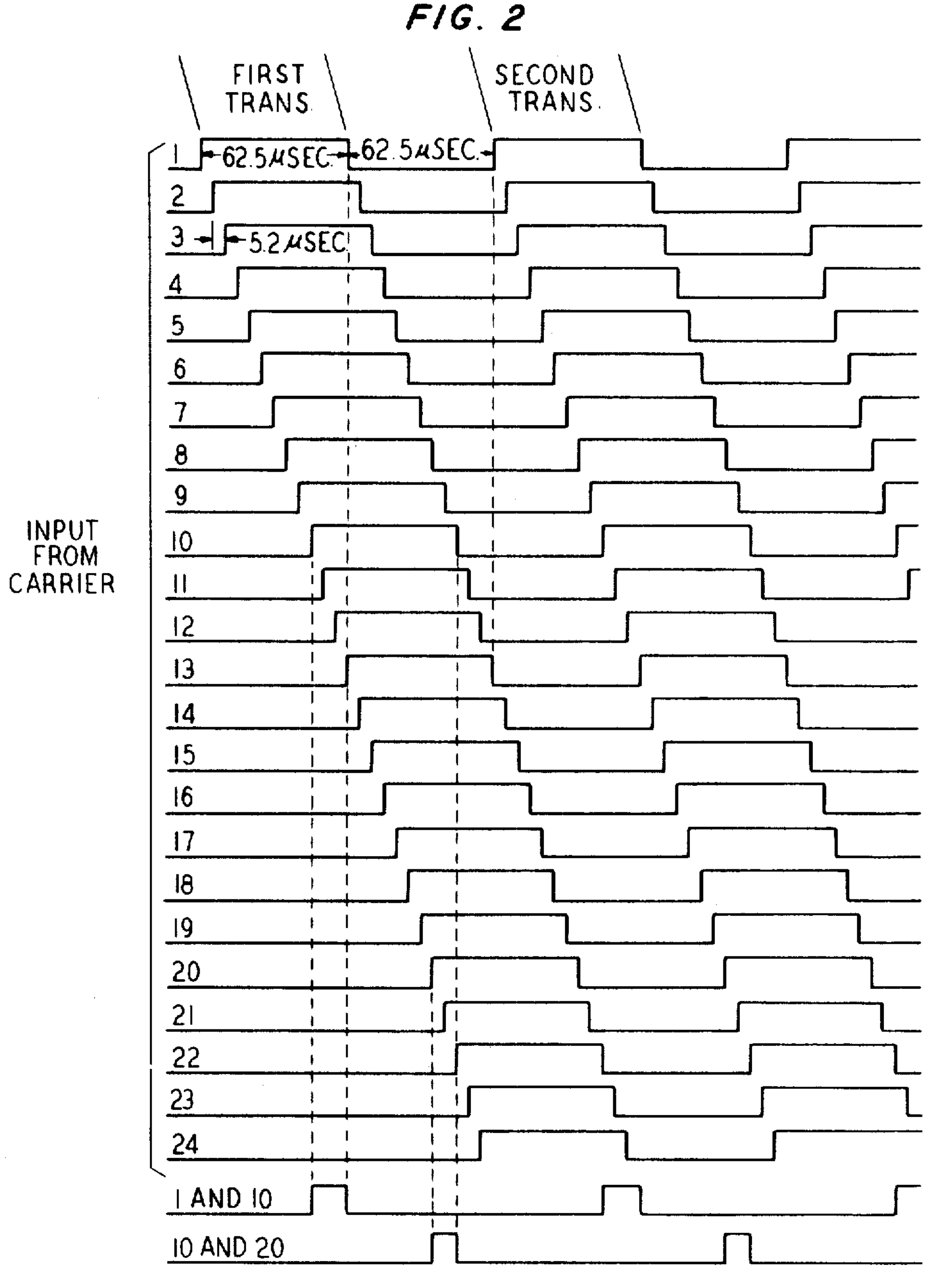
FIG. 2 discloses a waveform illustrating the staggered nature of the received data signals.

FIGS. 1A, 1B, and 1C, when arranged with respect to each other as shown in FIG. 1D, disclose the circuit details of a register circuit embodying my invention. The signals that are to be registered are received from the output of the 24 channel time division pulse code modulation (PCM) system which is represented by the rectangle designated 1001 in the left-hand portion of FIG. 1A. The PCM system 1001 is disclosed only diagrammatically since its details comprise no part of my invention and further, since the details of such systems are well known in the art. The output signals of the 24 channels of the PCM system appear on conductors CH1 through CH24. The nature of the output waveforms on the transmission of a binary 1 over each channel results in a staggered timewise sequence of positive going pulses as shown in FIG. 2. In the presently disclosed embodiment of the invention, the output of channels 1, 10, and 20 comprise three control signals; the output of channels 2 through 9 and 11 through 19 comprise seventeen binary bits representing the data words that may be transmitted over the system; the output of channels 21 through 24 comprise miscellaneous information and control signals.

Conductors CH2 through CH9 and CH11 through CH19 extend from the output of the PCM system to the lower input of the register gates IG2 through IG9 and IG11 through IG19. For purposes of brevity, these gates are hereinafter often referred to as the IG-gates. The output of each of these gates is connected to the S(set) terminal of a corresponding one of the register flip-flops ST2 through ST9 and ST11 through ST19 (hereinafter the ST-flip-flops). The IG-gates are normally in a closed or OFF state in order to isolate the flip-flops from the PCM system and, in turn, prevent the flip-flops from being falsely set due to noise on the transmission medium. As already described in connection with FIGS. 3A and 3B, an AND gate is said to be in a closed or OFF state when any one or more of its input conductors hold at a low or ground potential. A high on any of its remaining input conductors is ineffective to turn the gate ON so long as at least one of its input conductors remains at a low potential. With reference to FIG. 1A, the IG-gates are in an OFF state at this time by virtue of a low on conductor 44 for reasons subsequently described. By virtue of this low on conductor 44, the signals on conductors CH1 through CH9 and CH11 through CH19 (the CH-conductors), from the PCM system are not able to exert a controlling influence on the conduction of their respective IG-gates. As subsequently described, the IG-gates are controllably activated by a HIGH on conductor 44 during the reception of a data word to permit the signals on the CH-conductors to pass through the gates and be entered into the ST-flip-flops.

The conductive state of each IG-gate is jointly controlled by the potentials applied to its three input conductors. Each CH-conductor is connected to the lower input of its associated IG-gate. As may be seen from the timing diagram of FIG. 2, each CH-input conductor is normally at a ground or zero volt potential, but is driven positive in response to the reception of a binary 1 from the PCM system. The middle input of each IG-gate is connected via conductor 44 to the output of inverter gate G104 of the Correct Start Circuit on FIG. 1C. This circuit normally holds the IG-gates in an OFF condition by applying a ground to conductor 44 during the periods of time that data is not being received from the PCM system. One of the functions of the Correct Start Circuit is to detect the beginning of the reception of the first complete transmission of a new data word and then to partially unlock the IG-input gates at that time rather than, for example, in the middle of the reception of the first partial transmission of a data word. The reason for the necessity of the Correct Start Circuit is that it is an inherent characteristic of PCM systems that the first transmission of a new word need not start with the channel 1 signal but instead, may begin randomly with the signal for any channel. The reason for this is that the PCM transmitting equipment responds instantaneously to the receipt of newly applied data signals and therefore, if data signals are first applied during the middle of a scan cycle, the PCM transmitter immediately transmits the data bit of the channel currently being scanned. Since the scanner is continuous in its operation, and since the signals representing the data words to be transmitted may be applied to the transmitter at any time, it would be the exception, rather than the rule, that the first transmission of a new word would start with its channel 1 signal. Rather, it may reasonably be expected that the first transmission of a new word will not start with the channel 1 signal and will, therefore comprise only a partial transmission of the word.

In view of the above, and since it is desired that the register gates IG-not be opened until it is assured that the all signals of a word will be received, the Correct Start Circuit is provided to detect the beginning of a transmission of a complete word and, at that time, to unlock the IG-gates by raising the potential at the output of inverting gate G104 from that of ground to a positive potential, such as 24 volts. This positive potential unlocks the IG-gates and permits them to respond to the signals on the CH-conductors from the PCM system.

The upper input terminal of each IG-gate is connected via conductor 30 to inverting gates G120 and G121 in the Parity Check Control Circuit of FIG. 1B. These gates normally apply a high potential to conductor 30. However, as is subsequently described, once a word has been registered with good parity, conductor 30 is driven low in order to inhibit or close the IG-gates so that they will not respond, to the reception of any repeated transmissions of the same word.

In view of the foregoing, it may be seen (1) that the normal or idle condition of the system is such that the upper input of each IG-gate is high by virtue of conductor 30 and the Parity Check Control Circuit, (2) that the lower input of each IG-gate is connected to a CH-conductor to the output of its associated channel of the PCM system, and (3) that the middle input of each IG-gate is normally held low by the conductor 44 from the Correct Start Circuit. This low is effective by itself to maintain each IG-gate in an OFF state.

It has already been mentioned that the function of the Correct Start Circuit is to drive conductor 44 high and in turn open the IG-input gates only when a complete transmission of a data word is to be received. With reference to FIG. 2, it may be seen that the beginning of the reception of a complete transmission occurs with the application of a positive pulse by the PCM system to conductor CH1. However, in order to describe all aspects of the operation of the Correct Start Circuit, let it be assumed that the PCM system randomly initiates the transmission of a data word with the bit for the tenth channel. This causes a positive pulse to be applied to conductor CH10 on FIG. 1A which extends to the Correct Start Circuit of FIG. 1C. This pulse is applied to one input of each of gates G95 and G96. Both of these gates are normally OFF; gate G95 does not turn ON at this time since it is held OFF by the ground on conductor CH1 which has not yet received a signal; gate G96 turns on during the overlap of the CH10 and CH20 pulses. The turn ON of gate G96 at this time performs no useful function since gates G125 and G95 did not turn ON due to the absence of a CH1 signal. Therefore, the Correct Start Circuit does not respond to the reception of the CH10 pulse as the beginning of a data word. Since the outputs of channels 1, 10, and 20 are its only inputs, the Correct Start Circuit remains in an OFF condition and maintains the ground on its output conductor 44 as the data signals are received from channels 11 through 19 of the PCM system. The ground on conductor 44 maintains the IG-gates in an inhibited OFF state during this time so that they cannot respond to the data signals on the CH-conductors.

Next, the positive pulse from channel 20 is received on conductor CH20. The CH20 pulse is inverted by gate G199 and applied as a low or ground pulse to the lower input of gate G127. The other input of gate G127 is connected to the output of timer 52 whose function is to measure a period of time beginning with the first of a repeated series of pulses on conductor CH1 and ending 100 microseconds following the end of the reception of the last CH1 pulse in the series. The timer 52 functions in such a manner that (1) its output is low when there is no signal on channel 1 and (2) its output is high when there is a signal on channel 1 and for 100 microseconds thereafter. The low applied by timer 52 and gate G199 to both inputs of gate G127 hold it OFF at this time since no CH1 pulse was received. This prevents the I flip-flop from being set and maintains the low on conductor 44. The low from the output of the timer 52 is applied to the R input of the flip-flop to ensure that it is in a reset state.

In summary of the foregoing no action occurs within the Correct Start Circuit at this time to set the I flip-flop in response to the reception of the CH10 or the CH20 pulses. The output conductor 44 of this circuit remains low and holds the IG-input gates closed so that they cannot respond to the data signals on the CH-conductors.

Finally, when the partial transmission of the word is completed, a positive pulse is received on conductor CH1 for channel 1 and subsequently, the pulse on channel 20 terminates. The pulse on conductor CH1 is inverted by gate G125 and applied to the timer 52 which drives its output high extending to the upper input of gate G127. The ground or low potential on channel 20 at this time is inverted by gate G199 and the resultant high is applied to the lower input of gate G127. Both of the inputs of the gate are now high so that it now turns ON and drives its output low to set the I flip-flop. The setting of this flip-flop causes its 0 output to go low. This low is inverted by gate G104 and is applied via conductor 44 as a high to the middle input of each of the IG-input gates. Conductor 30 from the Party Check Control Circuit is still in a high state and therefore, the IG-input gates are now partially enabled and their conductive state is determined solely by the potentials applied by the PCM system to the CH-conductors. The IG-input gates remain partially enabled so long as the I flip-flop remains set and, in turn, maintains the high potential on conductor 44.

The timer 52 on FIG. 1C operates in such a manner that after it is initially turned ON by the reception of an inverted channel 1 pulse, it remains on for the duration of the pulse plus a period of 100 microseconds. With reference to FIG. 2 it may be seen that before 100 microseconds elapse following the termination of the channel 1 pulse on a first transmission, a channel 1 pulse is again being received for the next transmission of the same data word. This keeps the timer ON for the duration of the reapplied channel 1 pulse and following its termination, the timer remains ON for another 100 microsecond period within which a channel 1 pulse for the next transmission should be received. With this arrangement, the timer remains ON for the entire time that a data present pulse is received periodically by the CH1 conductor for the repeated transmissions of a single data word.

The series of channel 1 control pulses terminate with the last transmission of a word. The absence of a channel 1 pulse is detected by the timer 100 microseconds later. The output of the timer 52 returns to a low ground potential at that time and resets the I flip-flop. The resetting of this flip-flop applies a ground to conductor 44 to inhibit the IG-gates of FIG. 1 so that they can no longer respond to data signals on the CH-input conductors.

The ST2 through ST9 and ST11 through ST19 flip-flops receive the binary bits representing the transmitted data word during the time the IG-gates are partially enabled by the Correct Start Circuit. Each ST-flip-flop that receives a binary 1 (a positive pulse) at this time is switched to a set condition; each such flip-flop that receives a binary 0 (the absence of a positive pulse) remains in a reset state. The output conductors of the flip-flop are applied on a two-rail basis via cable ST to both the input of the Parity Check Circuit 1002 and the Comparison Circuit 1003. The Parity Check Circuit is shown only diagrammatically since circuits of this type are well known in the art. This particular circuit functions in such a manner that it checks the parity of the registered information for an odd 1 parity, and in the event that the parity checks good, it applies a high potential to its output conductor GPH and a low potential to its output conductor GPL. Conversely, for bad parity, a low potential is applied to conductor GPH and a high potential to conductor GPL. The parity checking operation is performed simultaneously on the entire word in the register flip-flops, rather than a half-word basis as in the case for the comparison operation.

The function of the Parity Check Control Circuit of FIG. 1B is to reset the ST-register flip-flops of FIG. 1A in the event that bad parity is detected and to inhibit the IG-input gates by a low on conductor 30 in the event that good parity is detected. If bad parity is detected, the register flip-flops are reset so that they may respond to and register the next transmission of the same word. For good parity, the IG-gates are closed by the low on conductor 30 for the time required for the comparison circuit to check the words stored in the ST-flip-flops with the signals received during the next transmission of the same word.

In the normal or idle state of the Parity Check Control Circuit, both flip-flops 20 and 21 are in a reset state. With respect to flip-flop 21, its 1 output is normally low which, by means of inverter gates G120 and G118, applies a high to conductors 30 and 31. The high on conductor 31 extends back to FIG. 1A to the reset terminal of each of the register flip-flops. This potential performs no useful function at this time. The high on conductor 30 extends back to FIG. 1A where it is connected to the upper input of each of the IG-gates. This high potential applied partially enables each of these gates so that their conductive state is controlled by potentials on conductor 44 and the CH-conductors.

In order to describe the entire operation of the Parity Check Control Circuit, let it first be assumed that a word is registered with bad parity. In this case, a high is applied to conductor GPL extending to the input of gate G109 on FIG. 1B, and a low is applied to conductor GPH extending to the middle input of gate G115 on the same FIG. Flip-flop 20 on FIG. 1B is normally in a reset state and thus its 0 output is high extending to the upper input of gate G109. The lower input of the gate is high at this time by virtue of the high on conductor GPL. A high is applied to both inputs of gate G96 of the Control Pulse Generator Circuit on FIG. 1C during the period of time that the channel 10 and channel 20 pulses are coincident with one another. On FIG. 2, this period of time is illustrated by the line on the bottom of the FIG. designated "10 and 20." The gate G96 turns on when the channel 10 and channel 20 pulses are coincident and generates a negative pulse at its output. This pulse is inverted by gate G102 and applied to conductor 1 which extends to the middle input of gate G109 and to the lower input of gate G115 on FIG. 1B.

The Control Pulse Generator Circuit is provided to generate the control pulses required for the operation of our system. This circuit receives as its input the pulses from channels 1, 10, and 20. By means of gate G95, it generates and applies to conductor 6 a negative pulse during the overlap of the channel 1 and 10 pulses. By means of gate 101, the negative pulse on conductor 6 is inverted and applied as a positive pulse to conductor 2. By means of gates G96 and G102 a positive pulse is applied to conductor 1 during the overlap of the pulses from channels 10 and 20.

It has already been explained how the upper and lower inputs of gate G109 are both high upon a determination of bad parity. Therefore, when the positive pulse is applied to conductor 1 and, in turn, to the middle input of gate G109 during the time that the signals on channel 10 and channel 20 overlap, all three inputs of the gate G109 go high and drive its output low to set flip-flop 21. The setting of the flip-flop drives its 1 output high which, by means of inverting gates G120 and G118, drives conductors 30 and 31 low. Conductor 31 extends to the reset terminal of the register flip-flops and the low on this conductor resets all flip-flops at this time. The low on conductor 30 is applied to the upper input of each of the IG-gates to inhibit them for the period of time that flip-flop 21 remains in a set state.

On FIG. 1C, the two inputs of gate G95 are connected to the CH1 and CH10 conductors. Both of these conductors are driven positive when the pulses on channel 1 and 10 overlap as is shown on the bottom portion of FIG. 2 by the line designated "1 and 10," Gate G95 turns on when its two inputs go positive and drives its output low. This low is connected over conductor 6 to the reset terminal of flip-flop 21 on FIG. 1B to reset the flip-flop.

The channel 1 and 10 pulses do not overlap and reset flip-flop 21 until the transmission of the word subsequent to the transmission for which bad parity is detected. Thus, when flip-flop 21 is reset, the register flip-flops are already in a reset state as a result of the detection of the bad parity and the setting of flip-flop 21. The resetting of flip-flop 21 removes the low from conductor 30 extending to the IG-gates so that they may be partially enabled by the high on conductor 44 in the same manner as already described. The high remains on conductor 44 continuously as long as the PCM system continues to retransmit the same data word. The detection of bad parity on a first transmission, the resetting of flip-flop 21 and the reenabling of the IG-gates is essentially an instantaneous operation so that the register flip-flops on FIG. 1A immediately respond and register the data signals received for the transmission immediately subsequent to the one for which bad parity is detected.

In summary of the operations described so far, it may be seen that bad parity was detected on the first transmission, and in response thereto, flip-flop 21 was set which, in turn, caused the register flip-flops to be reset. Subsequently, flip-flop 21 is reset during the next transmission of the same word, and in particular upon the concurrence of the channel 1 and channel 10 pulses for the next transmission. The IG-input gates are reopened by virtue of the high potentials reapplied to conductor 30 as flip-flop 21 is reset, and the signals received for the second transmission of the word are entered into the register flip-flops in the same manner as already described on the first transmission. The word entered into the register on the second transmission is checked for parity in the same manner as already described, and in the event that bad parity is again detected, the above-described operation, including the resetting of the register flip-flops are repeated until a word is registered with good parity.

When a word with good parity is detected, a high is applied to conductor GPH extending to gate G115 on FIG. 1B, and a low is applied to conductor GPL extending to gate G109 on the same FIG. With reference to gate G115, its upper input is normal since flip-flops 20 and 21 are normally in a reset state at which time their 1 output is low and by means of inverter gates G120 and G121, conductor 30 is high. Conductor 1 extending to the lower input of gate G115 is driven high during the concurrence of the channel 10 and 20 pulses. Since conductor GPH extending to the middle input of the gate G115 is high by virtue of good parity, gate G115 turns on upon the concurrence of the channels 10 and 20 pulses and drives its output low to set flip-flop 20. The setting of the flip-flop drives its 1 output high and the output of inverting gate G121 low. This low is extended over conductor 30 to the IG-input gates on FIG. 1A where it inhibits them as long as flip-flop 20 remains set. The inhibiting of the IG-gates prevents any change in the setting of the register flip-flops.

Conductor 44 which extends from the Correct Start Circuit to the IG-gates, also extends to the R (reset) terminal of flip-flop 20. Therefore, flip-flop 20 can be reset under control of the potential applied to conductor 44 by flip-flop I (FIG. 1C) via gate G104. It will be recalled from the operation previously described that flip-flop I is set and conductor 44 is switched from a low to a high potential when a signal is first present on channel 1 but not on channel 20. This condition represents the start of a complete transmission of a data word and it causes both inputs of gate G127 to go high to turn on the gate and drive its output low. This low switches the I flip-flop from a reset to a set state and drives conductor 44 high. Once flip-flop I is set, it remains in that state as long as signals are received on channel 1 for successive transmissions of the same word. It is typical in many PCM systems, that each data word is transmitted approximately 40 times, and therefore flip-flop I remains set for all subsequent transmissions of the same word. The timer 52 will finally turn OFF and flip-flop I will be reset 100 microseconds after the last transmission of the word when a signal is no longer received from channel 1. The 0 output of the I flip-flop goes high when the flip-flop is reset and, via gate 104, applies a low to conductor 44 to inhibit the IG-gates on FIG. 1A and to reset flip-flop 20. The resetting of this flip-flop 20 drives its 1 output low and by virtue of gate G121 drives conductor 30 high. The high on this conductor is extended to FIG. 1A to partially enable the IG-gates so that they may be fully enabled by the Correct Start Circuit upon the reception of the first complete transmission of the next data word. Prior to the time that flip-flop 20 is reset, its 1 output holds conductor 30 low and thereby inhibits the input gates and prevents the register flip-flops from responding to further signals from the output of the PCM system.

In brief summary of the operations associated with the registration of a word for good parity, flip-flop 20 is set and drives conductor 30 low to inhibit the IG-gates to prevent the register flip-flops from responding to the further transmissions of the same word. Flip-flop 20 remains set and the IG-gates remain inhibited from the reception of the channel 1 pulse for each repeated transmission of the same word. Subsequently, following the last transmission of the word, the channel 1 pulse is no longer present, the timer 52 on FIG. 1C turns OFF and resets the I flip-flop which applies a low to conductor 44 to reset the flip-flop 20. The resetting of this flip-flop reapplies a high to conductor 30 to partially enable the input gates and put their conductive state under the joint control of conductor 44 and the channel input conductors.

As is subsequently described, when a word is registered with good parity, the register flip-flops are reset by other means prior to the last transmission. In particular, they are set under control of the Comparison Control Circuit on FIG. 1B after this circuit has determined that a good comparison exists between two repeated transmissions of the same word.

The Comparison Circuit 1003 on FIG. 1A compares the word entered into the ST-flip-flops on a first transmission with the signals received from the PCM system and representing the same word on the next transmission. The outputs of the flip-flops are extended as inputs to the comparison circuit on a two-rail basis via the cable ST. The signals received on the next transmission are applied as inputs to the Comparison Circuits via the cable CH. This cable contains the input conductors CH2 through CH9 and CH11 through CH19. The Comparison Circuit is shown only diagrammatically since circuits for performing this function are well known in the art. The Comparison Circuit functions in such a manner that its output conductors C1H and C2H are normally low, that conductor C1H goes high in the event a good comparison is detected for the first half of the word, and that conductor C2H goes high when a good comparison is detected for the second half of the word. A good comparison is detected for the first half of the word when the signals received on input conductors CH2 through CH9 from the PCM system correspond to the output signals provided by register flip-flops ST2 through ST9. Similarly, a good comparison is detected for the second half of the word when the signals received by conductor CH11 through CH19 correspond to the information provided at the outputs of register flip-flops ST11 through ST19.

The Comparison Control Circuit on FIG. 1B receives signals from the Parity Check Control Circuit, from the Comparison Circuit, and from the Control Pulse Generator. In response to these signals, the circuit determines whether the word stored in the register flip-flops was found to have good parity, and if it does, whether an identity was found by the Comparison Circuit between the word in the register and that received on the immediate next transmission from the PCM system. The Comparison Control Circuit performs this function by analyzing the outputs of the Comparison Circuit for the first and second halves of the compared words independently.

In order to describe the operation of the Comparison Control Circuit, it will be initially assumed that a lack of comparison is detected for the first half of a word. In this case, conductor C1H extending to the input of the inverter gate G140 on FIG. 1B is low. This low is inverted by the gate and applied as a high to the lower input of gate G113. Conductor 8 extends from the 1 output of flip-flop 20 to the middle input of AND gate G113. This conductor is high at this time since flip-flop 20 is set when the word stored in the register flip-flops has good parity. If good parity had not been found, conductor 8 would be low and no action would be taken by the Comparison Control Circuit. The upper input of gate G113 is connected to conductor 2 which is driven positive during the time that the signals on channels 1 and 10 overlap. Therefore, during this period of overlap, all three inputs of AND gate G113 are high and the gate turns ON and drives its output low. This low is extended to the S (set) terminal of flip-flop 24 to switch it from a reset to a set state. All of flip-flops 22 through 26 are normally in a reset state during the idle or normal state of the circuit. The switching of flip-flop 24 to a set state drives its 1 output high which is extended to the upper input of AND gate G116. The other input of this gate is connected to conductor 1 which is driven high during the time that the signals on channels 10 and 20 overlap. Therefore, during this period of overlap, both of the inputs to gate G116 are high, the gate turns ON, drives its output low, and sets flip-flop 26. The setting of this flip-flop drives its 0 output low. This low turns off gate G114 which applies a high to the lower input of gate G100. The other input of this gate is connected to conductor 2 which is driven positive during the time that the signals on channels 1 and 10 overlap. Therefore, during the next period of overlap for these two channels, gate G100 turns ON and drives its output low. The low on its output is extended over conductor 44 to the reset terminal of flip-flops 22 and 23 to reset them in the event that they, for some reason are not already in a reset state at this time.

The high at the output of gate G114 is inverted by gate G146 and applied via conductor 31 back to the reset terminals of the register flip-flops of FIG. 1A to reset them. This permits the registers to receive and store the next transmission of the word in the event that a lack of comparison was detected between the two successive transmissions by the Comparison Circuit.

In partial summary of the preceding, it may be seen that if bad comparison is detected for the first half of the word, flip-flop 24 is set which sets flip-flop 26 which, in turn, causes a low to be applied to conductor 31 to reset the register flip-flops on FIG. 1A. In this event, the entire sequence of operations described so far are repeated as the next transmission of the word is entered into the registers, checked for parity, and then checked for comparison.

Let it next be assumed that the Comparison Circuit determines that an identity exists between the two successive transmissions of the first half of the word. In this case, conductor C1H extending to the middle input of AND gate G110 is high. The lower input of gate G110 is high at this time since flip-flop 23 in normally in a reset state. This reset condition of flip-flop 23 applies the low on its 1 output to the inverter gate G203 which applies a high to the lower input of gate G110. The lower input of gate G110 is also connected to conductor 2 which is normally low, but is driven high during the time that the pulses on channels 1 and 10 overlap. Therefore, during the next period of overlap of these two pulses, all of the inputs of gate G110 go high, the output of the gate goes low and sets flip-flop 22 which drives its 1 output high. This high is extended of the upper input of gates G111 and G112 where it prepares the Comparison Control Circuit so that it may analyze the results of the comparison of the second half of the word.

Let it initially be assumed that bad comparison is detected for the second half of the word. In this case, a low is applied to conductor C2H and is extended to gate G141 where the low is inverted and applied as a high to the lower input of gate G112. The upper input of this gate is connected to the high currently on the 1 output of flip-flop 22 since this flip-flop is in a set stage at this time. The middle input of this gate is connected to conductor 1 which is normally low but which is driven high during the period of time that signals on channel 10 and 20 overlap. Therefore, the next time these two signals overlap, the gate is turned ON, its output is driven low, and flip-flop 25 is set. The setting of this flip-flop drives its 0 output low, the output of gate G114 high, and the output of gate G146 low. The low from gate G146 is applied to conductor 31 which extends back to the R terminals of the register flip-flops to reset them at this time. The high on the output of gate G114 is extended to the lower input of gate G100. The other input of this gate is connected to conductor 2 which is driven high the next time that the signals on channels 1 and 10 overlap. At this time, the gate turns ON, its output is driven low to reset flip-flop 22. The resetting of the register flip-flops permits the register to receive and store the signals received for the next transmission of the word. The entire sequence of operations described so far are then repeated as the newly registered word is checked for parity and then checked for comparison.

Let it next be assumed that good comparison is found for the second half of the word. In this case, conductor C2H extending to the upper input of gate G207 is high. The lower input of this gate is connected to the 0 output of flip-flop 25. Since this flip-flop is currently in a reset state, its zero output is high and, in turn, the lower input of gate G207 is high. Since both inputs of gate G207 are currently high, its output is low, the output of inverter gate G208 is high and this high is extended to the lower input of G111. The upper input of gate G111 is connected to the high on the 1 output of flip-flop 22 which is in a set state. The middle input of gate G111 is connected to conductor 2 which is driven high whenever an overlap occurs between the signals on channels 1 and 10. Therefore, during the next overlap of these two signals, all three inputs of AND gate G111 become high, the gate turns ON, its output goes low, and flip-flop 23 is set. The setting of this flip-flop causes its 1 output to go high. This high is inverted by gate G103 whose output applies a low to gates G111 and G112 in order to inhibit them and prevent them from responding to any further signals for the time being. The high on the 1 output of flip-flop 23 is inverted by gate G203 and applied as a low to an input of each of gates G110, G113, and G100 in order to inhibit these gates and prevent them from responding to a further signal for the time being. The low on the 0 output of flip-flop 23 is inverted by gate G142 and applied over conductor 45 as a high to the translator gates 1004 on the right half of FIG. 1C. The conductive condition of these gates is jointly controlled by signals transmitted to these gates from the register via cable ST and by the potential applied via conductor 45. The various individual conductors in the cable ST interconnect each output conductor of the register flip-flop with an AND gate individual to the conductor. Thus, conductor ST2–1 is connected to the lower input of AND gate T2-1 and similarly conductor ST19–0 is connected to the lower input of AND gate T19-0. The other input of each AND gate is connected to conductor 45. The function of the AND gates is to permit a control of the time at which the information in the ST-flip-flops is to be made available to the translator. Conductor 45 extending from the Comparison Control Circuit to the translator gates is normally low. This low maintains each gate in an OFF state and prevents the registered information from passing through the gate to the translators. The low on conductor 45 is maintained during the time a data word is entered into the register on the first transmission, during the time the registered information is checked for parity, and during the initial portion of the comparison operation. However, after the Comparison Control Circuit determines that good comparison exists, conductor 45 goes high and enables the translator AND gates so that the output of the ST-register flip-flops may be applied to the translators.

The function of the translator is to receive the binary information supplied via the ST-conductors and to translate this information into a plurality of 1-out-of-*N*-type information bits. The register translator of my invention may be used in a system in which telephone operator positions are remotely situated with respect to a central office with the operator positions and the central office being interconnected solely by means of time division pulse code modulation systems. The function of my register in such a system would be to register, and subsequently to translate, the information that is transmitted from the central office to the remote operation location. This information is used at the remote location to control the lamp displays and the like at the operator positions. Each data word received and registered uniquely specifies the operator position to which it pertains, the particular lamp at the specified operator position that is to be affected, and lastly, specifies whether this lamp is to be operated or extinguished. If desired, additional bits of the registered information may represent other miscellaneous type control information.

In a typical use of the register translator in a telephone system as described, the binary bits received on channels 2 through 7 represent position address information that is to be translated from binary to 1-out-of-*N*-type form. In a similar manner, the signals on channels 8, 9, and 11 through 14 represent lamp information for the specified position. The binary bit on channel 15 indicates whether the specified lamp at this specified position is to be operated and released. The binary bits on channels 16, 17, and 18 represent miscellaneous type of control signals such as, for example, maintenance, et cetera.

The information that is translated from binary to 1-out-of-*N* form by the individual translators 1005–1 through 1005–4 are applied to the data utilization circuit 1006 which, in the manner well known in the art, responds to the receipt of the 1-out-of-*N*-type information bits to control the lamp displays at the operator positions (not shown). The translators are shown only diagrammatically since their details comprise no part of the present invention and since circuits for performing such translation functions are well known in the art.

The signals received on channels 21 through 24 are shown as being applied directly to the data utilization circuit 1006 without being checked for parity or comparison. The signals received on these channels may perform certain miscellaneous type control and maintenance functions.

The high on conductor 45 remains as long as flip-flop 23 remains set. The R terminal of this flip-flop, together with the R terminal of flip-flop 22, is connected to conductor 44 which is connected to the output of gate G104 of the correct start circuit. As already mentioned, the high on this conductor remains as long as the output of timer 52 remains high and, in turn, the 1 flip-flop remains set. 100 microseconds after the final transmission of the word, the output of timer 52 goes low, resets flip-flop I which, in turn, causes the potential on conductor 44 to go low. This low inhibits the input gates on FIG. 1A and additionally resets flip-flops 22 and 23. This same ground is extended to the lower input of gate G114 to turn the gate OFF, drive its output high, and drive the output of inverter G146 low. The output of this gate is extended via conductor 31 to the reset terminals of the register flip-flops to reset them and thereby restore the circuit to its normal condition in which it waits the reception of the transmission of the next data word.

Alternatively, rather than wait until the end of the transmission of the same word for a predetermined number of times, the data utilization circuit may transmit a signal back over conductor 1007 to the PCM system to the transmitter 1008 which, in turn, sends a signal to the transmitting end of the system to advise it that the transmitted word has been successfully registered, checked for parity, compared and translated into the desired number of 1-out-of-*N*-type information bits. In response to this signal the transmitter at the central office may immediately abort further transmissions of the word and thereby initiate the reset actions already described.

It is to be understood that the above-described arrangements are but illustrative of the application of the principles of the invention. Numerous other arrangements may be devised by those skilled in the art without departing from the spirit and scope of the invention.

I claim:

1. In a plural order register for receiving a data word represented by a timewise staggered sequence of data signals with the signals comprising a first portion of said word being concurrent with each other for a time less than the duration of any one signal and with the signals comprising a second portion of said word being concurrent with each other for a time less than the duration of any one signal, register means, means responsive to the concurrence of the signals comprising a first portion of a received word for generating an output signal indicating whether an identity exists between the signals comprising said first portion and the corresponding portion of a word currently stored in said register means from a preceding reception of data signals, and means responsive to the concurrence of the signals comprising a second portion of said word for generating an output signal indicating whether an identity exists between the signals comprising said second portion and the corresponding portion of said word currently stored in said register means.

2. In a plural order data registration system, means for receiving repeated transmissions of a data word having a first and a second portion and represented by a timewise staggered sequence of signals in which all signals comprising each portion are concurrent with each other but not with all signals of the other portion, a register, means responsive to a first reception of a word for entering said word into said register, a comparison circuit for receiving the signals comprising a subsequent transmission of said word, and means including said comparison circuit responsive to the concurrence of the retransmitted signals comprising each portion of said word for generating separate output signals indicating whether an identity exists between each portion of said retransmitted word and the corresponding portion of the word in said register.

3. The invention of claim 2 in combination with means responsive to said output signals for generating a control signal indicating whether an identity exists between the entirety of a registered and a currently received word.

4. The invention of claim 3 in combination with means responsive to a signal indicating that said received and said registered words are not identical for resetting said register so that the word represented by the next transmission of data signals may be entered into said register.

5. In a data registration system for receiving repeated transmissions of a data word represented by a timewise staggered sequence of signals with each signal being concurrent with some but less than all of the signals comprising said sequence, a register, means responsive to the first reception of a word for entering said word into said register, a comparison circuit having a first and a second portion, means including said first portion of said comparison circuit responsive to the concurrence of a first received and an intermediate received signal of said sequence on a subsequent transmission of a word for generating an output signal indicating whether an identity exists between the portion of the word represented by said first through said intermediate signals of said sequence and the corresponding portion of the word currently stored in said register, and means including said second portion of said comparison circuit responsive to the concurrence of an intermediate and a last received signal of said sequence on said subsequent transmission for generating an output signal indicating whether an identity exists between the portion of the word represented by said intermediate through the last signals of said sequence and the corresponding portion of the word currently stored in said register.

6. In a plural order data registration system for receiving a data word represented by a timewise staggered sequence of signals with each signal being concurrent with some but not all of the signals comprising said sequence, an input conductor individual to each order of said system, a register, means for repeatedly applying to said input conductors the signals representing each data word that is to be registered, means responsive to a first reception of a data word for entering it into said register, a comparison circuit, means for applying the signals representing each received data word to said comparison circuit, means responsive to the concurrence of a first received and an intermediate received signal of said sequence on a subsequent reception of said word for generating an output signal indicating whether an identity exists between the portion of a word represented by said first through said intermediate signals of said sequence and the corresponding portion of the word currently stored in said register, and means responsive to the concurrence of an intermediate and a last received signal of said sequence on said subsequent reception for generating an output signal indicating whether an identity exists between the portion of a word represented by said intermediate through the last signals of said sequence and the corresponding portion of the word currently stored in said register.

7. The invention of claim 6 in combination with means responsive to said last-named output signal for generating a control signal indicating whether an identity exists between the entirety of a registered and said currently received word.

8. The invention of claim 7 in combination with means responsive to said control signal when an identity does not exist between a currently received and a registered word for resetting said register so that the word received on the next transmission may be entered therein.

9. In a plural order data registration system for receiving a data word represented by a timewise staggered sequence of signals with each signal being concurrent with at least the adjacent signals of said sequence but with less than all of the other signals of said sequence, an input conductor individual to each order of said system, means for repeatedly applying to said input conductors the signals representing each data word that is to be registered, a plurality of normally inhibited gates each of which is individually connected to one of said input conductors, means responsive during the reception of a word for initially enabling said gates when a first signal of a newly received sequence representing said word is not concurrent with the last signal of a preceding sequence, a plural order register, and means connecting each register order to the output of an individual one of said gates so that the signals applied to said gates when in an enabled condition may be entered into said register.

10. The invention of claim 9 in combination with means responsive to the entry of a word into said register for inhibiting said gates to prevent the passage of subsequently received data signals therethrough.

11. The invention of claim 10 in which said last-named means comprises, a parity check circuit responsive to the registration of a word in said register for generating a signal indicating whether said word is registered with good parity, and means responsive to said good parity signal for applying an inhibiting potential to said gates.

12. The invention of claim 11 in combination with means responsive to a signal indicating bad parity for resetting said register so that the word represented by the next application of a signal to said input conductors may be entered into said register.

13. The invention of claim 12 in combination with comparison means responsive to an indication of good parity for determining whether an identity exists between the word represented by the signals next applied to said input conductors and the word currently in said register.

14. The invention of claim 13 in combination with means responsive to the concurrence of a first received and an intermediate received signal of said next received sequence for generating a signal indicating whether an identity is found by said comparison circuit on that portion of said word represented by all the signals therebetween, means responsive to the concurrence of an intermediate and a last received signal of said next received sequence for generating a signal indicating whether an identity is found by said comparison circuit on that portion of said word represented by all signals therebetween, and means responsive to said last-named signal for generating a signal indicating whether an identity is found by said comparison circuit for all of said word.

15. The invention of claim 14 in combination with means responsive to a signal indicating that said received and registered words are not identical for resetting said register and for enabling said gates.

16. The invention of claim 14 in combination with means responsive to the termination of the repeated application of signals to one of said input conductors for resetting said register.